Patented Oct. 13, 1936

2,057,463

UNITED STATES PATENT OFFICE 2,057,463

CONTROL SYSTEM

Charles P. West, Edgewood, Pa., assignor to Westinghouse Electric & Manufacturing Company, East Pittsburgh, Pa., a corporation of Pennsylvania Application January 6, 1933, Serial No. 650,396

16 Claims. (Cl. 171—242)

My invention relates, generally, to electrical control systems, and, more particularly, to systems for controlling the current supplied to a plurality of electrical circuits.

It is well known in the art that the current supplied to a given load which is fed from an alternating-current source may be regulated by means of a saturable-core reactor having an alternating-current winding, which is connected in series with the load, disposed on the outer legs of the core of the reactor and a direct-current control winding disposed on the middle leg of the reactor. By varying the current in the control winding the degree of saturation of the core of the reactor may be varied and, therefore, the effective reactance of the reactor and the current permitted to flow through the alternating-current winding and the load circuit may be controlled.

It is also known that considerable amounts of alternating-current energy may be controlled in accordance with variations in a small amount of direct-current energy by connecting two, or more, saturable-core reactors in cascade relation, thereby utilizing one of the reactors as a magnetic amplifier. However, previously known systems of this character have not been utilized commercially for controlling the current in a plurality of electrical circuits because of the large amount of apparatus required to control more than one circuit and the cost thereof.

An object of my invention, generally stated, is to provide a system for controlling the current in an electrical circuit which shall be simple and efficient in operation and which may be economically manufactured and installed.

A more specific object of my invention is to provide an improved system for controlling the current in a plurality of electrical circuits by means of saturable-core reactors.

Another object of my invention is to provide for supplying pulsating direct current to a plurality of control reactors individual to load reactors and which control the saturating current for the load reactors by means of a single set of valves or rectifiers and a single circuit common to all of the pairs of reactors.

Other objects of my invention will either be explained fully hereinafter or will be apparent to those skilled in the art.

In accordance with my invention, the current in a load circuit is controlled by a large reactor, connected in series with the load. The saturating winding of this reactor is supplied with current through a second reactor which serves as an amplifying means. In this way a small amount of direct-current energy serves to control the current in the load circuit. The second reactor is provided with a plurality of windings which are so connected to a transformer through electric valves or directly to a source of suitable voltage, that the output current of the second reactor, which supplies current to the control winding on the first reactor, is the equivalent of full-wave rectified current.

Since the transformer and electric valves which supply the second reactor may be utilized as a common means to supply any number of reactors for controlling a plurality of load circuits, a saving is effected in the cost of the equipment required over that for previously known systems, in which individual rectifying means are provided between each control reactor and its associated load reactor to rectify the output current of the control reactor in order that the saturating winding of the load reactor will be supplied with direct current.

For a fuller understanding of the nature and scope of my invention, reference may be had to the following detailed description taken in conjunction with the accompanying drawings, in which.

Figure 1:
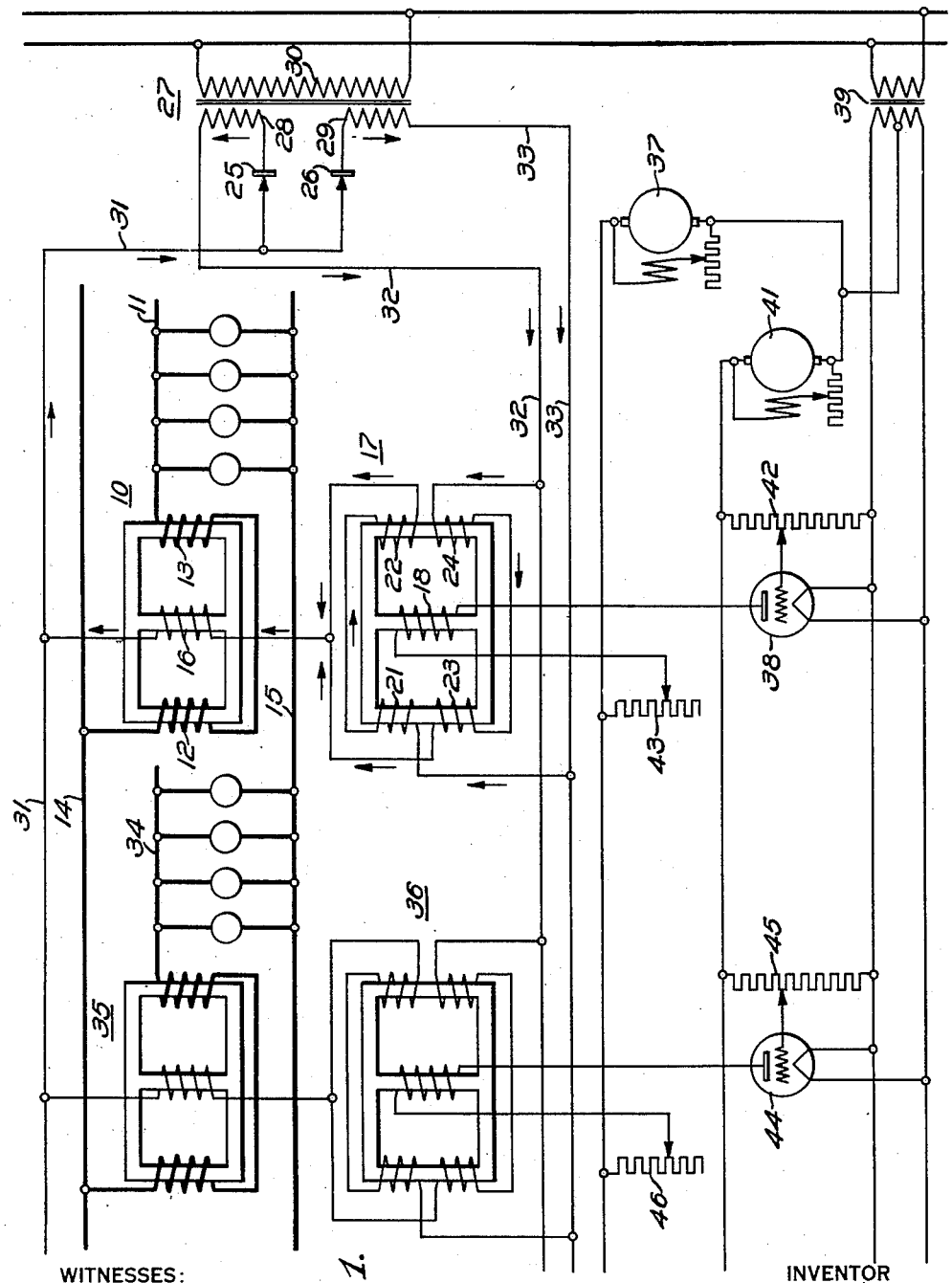
Figure 1 is a diagrammatic view of a control system embodying my invention.

Referring now to Fig. 1 of the drawings, a reactor 10 is utilized for controlling the current in a load circuit 11, illustrated as supplying incandescent lamps. However, the system herein described may be readily utilized to control the current in loads of various other types, as, for example, electric furnaces, or other heating devices. The reactor 10 is provided with an alternating current winding which is divided into two sections 12 and 13, disposed on the outer legs and connected in series with the load, which is connected across conductors 14 and 15. The conductors 14 and 15 may be energized from any suitable source of alternating-current energy (not shown). The reactor 10 is also provided with a control winding 16 by means of which the reactance of the reactor and, therefore, the current in the load circuit may be controlled, as hereinbefore explained.

The saturating winding 16 of the reactor 10 is supplied with current through a second or control reactor 17, which is provided with a control winding 18, similar to the winding 16 on the reactor 10. However, each of the windings on the outer legs of the reactor 17 is divided into two sections, as shown on the drawings, section 21 of the winding on one leg being connected in series with section 22 on the other leg and, similarly, section 23 is connected in series with section 24.

In previously known systems utilizing reactors connected in cascade relation, it is necessary to provide a means for rectifying the output current of the one reactor, which is alternating current, before it can be utilized to energize the saturating winding of the other reactor, since the saturating windings of both reactors must be energized by direct current.

In the system herein described, the windings 21, 22, 23 and 24 on the reactor 17, carry pulsating direct current having opposite polarities and the flow of the pulsating current through the saturating winding 16 on reactor 10, is controlled by electric valves 25 and 26 in such a way that the equivalent of full-wave rectified current is produced. The valves 25 and 26 may be any suitable device which will pass current in only one direction, such as copper-oxide disc rectifiers or thermionic tubes, which have the characteristic of allowing current to flow through them in only one direction.

Figure 2:
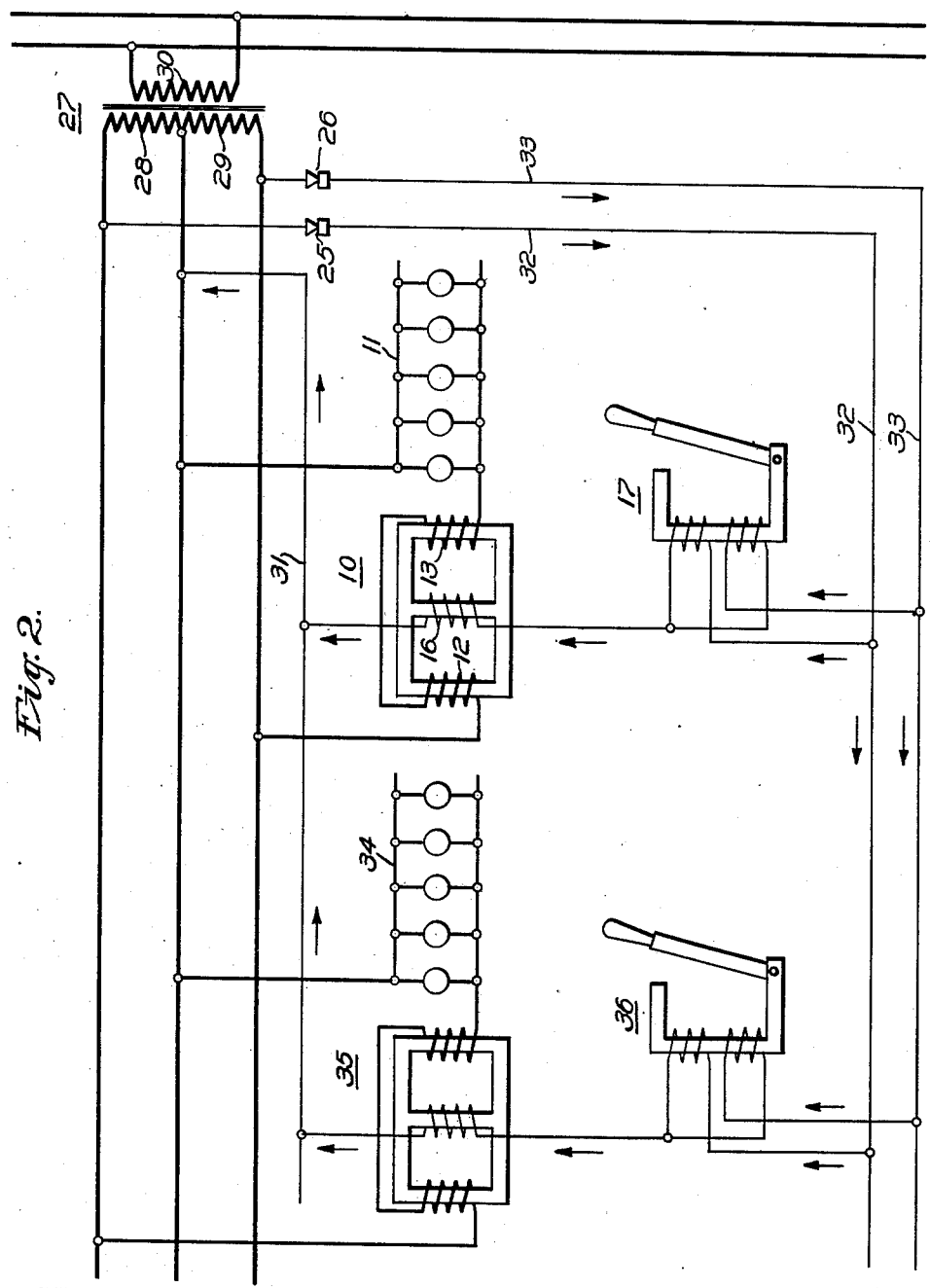
Fig. 2 is a diagrammatic view of a modification of the system shown in Fig. 1.

The alternating-current control energy for the system is supplied through a transformer 27, whose primary winding 30 may be connected to any suitable alternating-current source (not shown), or as shown in Fig. 2, the valves may be connected directly to the distribution circuit which supplies current to the loads being controlled.

In this embodiment of the invention, the transformer 27 is provided with two secondary windings 28 and 29. The winding 28 is connected in series with the valve 25 and the winding 29 is connected in series with the valve 26. Since the valves 25 and 26 will pass current in one direction, it is evident that current can flow in only one direction through a conductor 31, which is connected to one side of the valves 25 and 26, and also that current can flow in only one direction through each of the windings 28 and 29 and conductors 32 and 33, which are connected to the windings 28 and 29, respectively.

As a result of the action of the valves 25 and 26 and the relation of the secondary windings 28 and 29 to the primary winding 30 of the transformer 27, current will flow through the winding 28 and the conductor 32 in the direction indicated by the arrows during one half cycle and through the winding 29 and the conductor 33 during the other half cycle of each alternation of the current in the primary winding 30 of the transformer 27. Therefore, the current which flows in each of the conductors 32 and 33 is a pulsating direct current. No current will flow in the conductor 32 when current is flowing in the conductor 33 and vice versa.

The conductors 31, 32 and 33 may be utilized as control buses to supply control energy to a plurality of reactors which are connected in the same manner as the reactors 10 and 11. In order to simplify the drawings and description, only one other lighting circuit 34, which is controlled by reactors 35 and 36, has been illustrated. However, it will be understood that as many circuits as desired may be provided, the apparatus and connections for each circuit being similar to those illustrated.

A portion of the pulsating current which is available on the control buses 32 and 33 will flow through the windings 21, 22, 23 and 24 on the reactor 17, which controls the value of the current permitted to flow, and then pass through the winding 16 on the reactor 10, thereby controlling the saturation of the reactor 10. The windings 21, 22, 23 and 24 are so disposed on the iron core of the reactor 17 that when a potential is impressed from bus 33 to bus 31, current will flow in windings 21 and 22 and through the winding 16 in the direction indicated by the arrows. When the voltage on the bus 33 falls to zero, as determined by the alternating voltage impressed on the primary winding 30 of the transformer 27, the current in the windings 21, 22 and 16 will also fall to zero. During the next half cycle of the voltage impressed on the primary winding 30, of the transformer 27, the potential on bus 32 will cause current to flow through the windings 23 and 24 and through winding 16 to bus 31. In each case, the direction of the current flow through the winding 16 is the same, and a pulsating current results which is the equivalent of a full-wave rectifier current.

Considering the effect of the windings 21, 22, 23 and 24 on the reactor 17, it is evident that they may be so wound on the core that when current passes through the windings 21 and 22, a flux is built up in the core in a certain direction and then dies out, and that during the next half cycle, when current flows through the windings 23 and 24, a flux is built up in the opposite direction. Therefore, the combined effect of the four windings on the core of the reactor 17 is substantially the same as would be obtained from equivalent windings disposed as are the windings 12 and 13 on the reactor 10. It is evident, therefore, that the core of reactor 17 is affected in the same manner as it would be by windings disposed in the same manner as windings 12 and 13, and carrying alternating current.

Since there is a change of flux in the core of the reactor 17 in response to each change of current in the windings 21, 22, 23 and 24, it is evident that the back-electro-motive forces generated by the change in flux are the controlling factors for the current which flows through these windings.

It is also evident that the electromotive-force generated in the windings 21, 22, 23 and 24 may be controlled by varying the degree of saturation in the core of the reactor 17 by means of the saturating winding 18, thereby controlling the current which will be caused to flow through them by a certain impressed potential.

In this manner, the direct current in the winding 18 varies the reactance of the reactor 17, which in turn controls the value of the pulsating current permitted to flow through the windings 21, 22, 23 and 24, and through the saturating winding 16 on the reactor 10. The degree of saturation of reactor 10 controls the current which flows through the load circuit 11, herein illustrated as comprising lamps. Therefore, by controlling the current in the winding 18, the current through the load is ultimately controlled. As previously stated, the principal advantage gained by utilizing reactors in cascade relation, as herein described, is that a relatively large amount of load current may be controlled by means of a very small amount of direct-current energy.

The direct current which passes through the control winding 18 of the reactor 17 may be supplied from any suitable source and may be varied in any convenient manner. In the system herein described, the direct current for the winding 18 is supplied from a generator 37 and is controlled by means of a thermionic tube 38 in a manner well known in the art. The filament of the tube 38 is energized from a transformer 39 and the grid biasing potential is supplied by a generator 41. The biasing potential on the tube 38 may be varied by means of a potentiometer 42 to control the current permitted to flow through the winding 18. If desired, a resistor 43 may be provided as an additional means of adjusting the current in the winding 18.

As previously stated, additional control units, composed of two reactors 35 and 36, similar to the reactors 10 and 17, may be connected to the control buses. The current in each load circuit may be controlled independently of the other circuits by providing thermionic tubes 44, potentiometers 45 and resistors 46, similar to those described, and connected to the direct-current control buses as shown.

Since all of the control energy for controlling the entire system is supplied by common units, namely, the transformers 27 and 39, and generators 37 and 41, and also since only one set of rectifying valves 25 and 26 are required, it is evident that a considerable saving will be effected in the cost of the equipment required for a system comprising a large number of load circuits, as compared with the cost of previously known systems wherein individual control equipment is required for each circuit.

In the modification of the invention shown in Fig. 2, the reactors 17 and 36 are of a type in which their reactance may be varied by changing the air gap in the magnetic circuit, thereby controlling the current permitted to flow through the pulsating-current windings and through the saturating windings on the reactors 10 and 35.

It will be noted that the transformer 27 may be utilized to supply the current for the load circuits, as well as the control current for energizing the control conductors 31, 32 and 33. The rectifiers 25 and 26 may be connected to the outer terminals of the secondary winding of the transformer and the conductor 31 may be connected to the mid-tap of the secondary winding, as shown in Fig. 2. In this manner the pulsating-current windings are alternatively energized with unidirectional current to produce a pulsating direct current in the saturating control windings of the load reactors 10 and 35, as previously described.

It will be noted further that in this arrangement, as in the arrangement shown in Fig. 1, all of the control reactors 17, 36, etc., are controlled by means of a single set of rectifiers or valves 25 and 26 and a single circuit comprising conductors 31, 32 and 33.

It is also apparent that other forms of control reactors 17 and 36 other than those illustrated in Figs. 1 and 2, may be utilized, it being immaterial to the functioning of the invention as to how the reactance of these control reactors is varied.

I do not desire to be restricted to the particular form or arrangement of parts herein shown and described, since it is evident that they may be changed and modified without departing from the spirit and scope of my invention as defined in the appended claims.

I claim as my invention:

1. In a control system, in combination, a load circuit disposed to be energized with alternating current, a reactor having a direct-current control winding and an alternating-current winding disposed to control the current in the load circuit, a second reactor having a plurality of pulsating-current windings disposed thereon in opposed relation to control the energization of the control winding of the first reactor, means for alternatively energizing the pulsating-current windings of the second reactor, and means for controlling the reactance of the second reactor, whereby the current in the load circuit may be controlled.

2. In a control system, in combination, a load circuit disposed to be energized with alternating current, a reactor having a direct-current control winding and an alternating-current winding disposed to control the current in the load circuit, a second reactor having a plurality of pulsating-current windings for controlling the energization of the control winding of the first reactor, said pulsating-current windings being disposed on the reactor in opposed relation, means for alternatively energizing the pulsating-current windings of the second reactor with unidirectional current, and means for varying the reactance of the second reactor, whereby the current in the load circuit may be controlled.

3. In a control system, in combination, a load circuit disposed to be energized with alternating current, a reactor having a direct-current control winding and an alternating-current winding disposed to control the current in the load circuit, a second reactor having a direct-current control winding and a plurality of magnetically opposed pulsating-current windings for controlling the energization of the control winding of the first reactor, means for alternatively energizing said windings with unidirectional current to cause a pulsating direct current to flow in the control winding of the first reactor, and means for controlling the energization of the direct-current control winding of the second reactor, whereby the current in the load circuit may be controlled.

4. In a control system, in combination, a load circuit disposed to be energized with alternating current, a reactor having a direct-current control winding and an alternating-current winding disposed to control the current in the load circuit, a second reactor having a direct-current control winding and a plurality of pulsating-current windings for controlling the energization of the control winding of the first reactor, said windings being disposed on the reactor in opposed relation, means for alternatively energizing said windings with unidirectional current to cause a pulsating direct current to flow in the control winding of the first reactor, and means for controlling the energization of the direct-current control winding of the second reactor, whereby the current in the load circuit may be controlled.

5. In a control system, in combination, a load circuit disposed to be energized with alternating current, a reactor having a direct-current control winding and an alternating-current winding disposed to control the current in the load circuit, a second reactor having a plurality of magnetically opposed pulsating-current windings for controlling the energization of the control winding of the first reactor, means including electric valves for alternatively energizing said windings with unidirectional current to produce a pulsating direct current in the control winding of the first reactor, and means for controlling the reactance of the second reactor, whereby the current in the load circuit may be controlled.

6. In a control system, in combination, a load circuit disposed to be energized with alternating current, a reactor having a direct-current control winding and an alternating-current winding disposed to control the current in the load circuit, a second reactor having a direct-current control winding and a plurality of magnetically opposed pulsating-current windings for controlling the energization of the control winding of the first reactor, a transformer disposed to energize said windings, electric valves interposed between the transformer and said windings to cause said windings to be alternatively energized with unidirectional current to produce a pulsating direct current in the control winding of the first reactor, and means for controlling the energization of the direct-current control winding of the second reactor, whereby the current in the load circuit may be controlled.

7. In a control system, in combination, a load circuit disposed to be energized with alternating current, a reactor having a direct-current control winding and an alternating-current winding disposed to control the current in the load circuit, a second reactor having a direct-current control winding and a plurality of magnetically opposed pulsating-current windings for controlling the energization of the control winding of the first reactor, a transformer having two secondary windings disposed to energize said pulsating-current windings, an electric valve connected in series-circuit relation with each of the transformer secondary windings to cause said pulsating-current windings to be alternatively energized with unidirectional current to produce a pulsating direct current in the control winding of the first reactor, and means for controlling the energization of the direct-current control winding of the second reactor, whereby the current on the load circuit may be controlled.

8. In a control system, in combination, a load circuit disposed to be energized with alternating current, two reactors connected in cascade relation for controlling the current in the load circuit, one of said reactors having a saturating control winding and an alternating current winding connected in series-circuit relation with the load circuit, the other of said reactors having a plurality of magnetically opposed pulsating-current windings for controlling the energization of the saturating winding of the first reactor, a transformer disposed to energize said pulsating-current windings, current rectifying means interposed between the transformer and said windings to cause them to be alternatively energized with unidirectional current to produce a pulsating direct current in the saturating winding of the first reactor, and means for adjusting the air gap of the second reactor to vary its reactance, whereby the current in the load circuit may be controlled.

9. In a control system, in combination, a plurality of load circuits disposed to be energized with alternating current, a pair of reactors connected in cascade relation for controlling the current in each load circuit, one of the reactors of each pair having a saturating control winding and an alternating-current winding connected in series-circuit relation with its respective load circuit, the other reactor of each pair having a direct-current control winding and a plurality of magnetically opposed pulsating-current windings for controlling the energization of the saturating winding of the first reactor, a transformer disposed to energize the pulsating current windings on all of said reactors, a pair of electric valves disposed to cause the pulsating-current windings to be alternatively energized with unidirectional current to produce a pulsating direct current in the saturating control windings of the reactors, and means for controlling the energization of the direct-current control windings of the reactors, whereby the current in each load circuit may be controlled.

10. In a control system, in combination, a plurality of load circuits disposed to be energized with alternating current, a pair of reactors connected in cascade relation for controlling the current in each load circuit, one of the reactors of each pair having a saturating control winding and an alternating-current winding connected in series-circuit relation with its respective load circuit, the other reactor of each pair having a direct-current control winding and a plurality of magnetically opposed pulsating-current windings for controlling the energization of the saturating winding of the first reactor, a transformer disposed to energize the pulsating-current windings on all of said reactors, a pair of electric valves disposed to cause the pulsating-current windings to be alternatively energized with unidirectional current to produce a pulsating direct current in the saturating control windings of the reactors, a common source of direct current for energizing all of the direct-current control windings on the reactors, and means for individually controlling the energization of each direct-current control winding, whereby the current in each load circuit may be individually controlled.

11. An alternating-current control system comprising a plurality of saturable-core reactors for controlling individual loads, a smaller variable reactance associated with each load-controlling reactor and having current windings disposed thereon in opposed relation, and a common rectifying means for providing current for said windings, said current being controllable by the variable reactances for saturating the saturable-core reactors.

12. An alternating-current control system comprising a plurality of saturable-core reactors for controlling individual loads, a pair of electric valves for providing unidirectional current for saturating all of the saturable-core reactors, a variable reactance associated with each of the saturable core reactors for controlling the saturating current, and unidirectional current windings disposed on each variable reactance in opposed relation for alternately conducting the saturating current of its associated saturable-core reactor.

13. In a control system, in combination, a source of alternating-current power, a plurality of pulsating-current control circuits energized from said power source, common rectifying means for supplying all of said control circuits with pulsating direct current, and control means for individually controlling the current in each of the control circuits independently of the pulsating current supplying means, said control means being energized independently of said pulsating current supplying means.

14. In a control system, in combination, a plurality of load circuits, a source of alternating-current power, a plurality of pulsating-current control circuits for controlling the current in the load circuits, common rectifying means for supplying all of said control circuits with pulsating direct current from the alternating-current power source, and control means for individually controlling the current in each of the control circuits independently of the pulsating current supplying means, said control means being energized independently of said pulsating current supplying means.

15. In a control system, in combination, a plurality of load circuits, a source of alternating-current power, control devices for controlling the current in the load circuits, a plurality of control circuits for energizing the control devices, common rectifying means for supplying all of said control circuits with pulsating direct current from the alternating-current power source, and control means for individually controlling the current in each of the control circuits independently of the pulsating current supplying means, said control means being energized independently of said pulsating current supplying means.

16. In a control system, in combination, a plurality of load circuits, a source of alternating-current power, magnetic amplifying devices for controlling the current in the load circuits, a plurality of control circuits for energizing the magnetic amplifying devices, common rectifying means for supplying all of said control circuits with pulsating direct current from the alternating-current power source, and control means for individually controlling the current in each of the control circuits independently of the pulsating current supplying means, said control means being energized independently of said pulsating current supplying means.

CHARLES P. WEST.